J. C. BETHEA.
Cultivator.
No. 61,705. Patented Feb. 5, 1867.
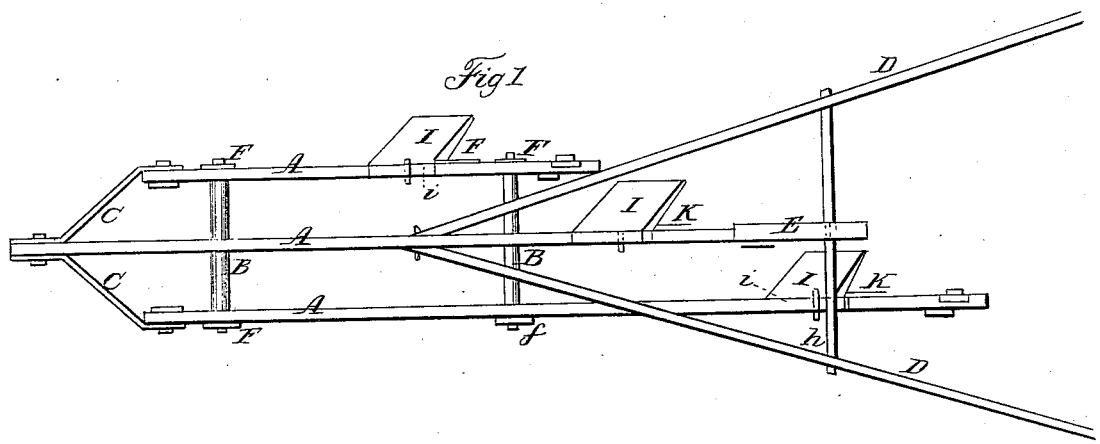
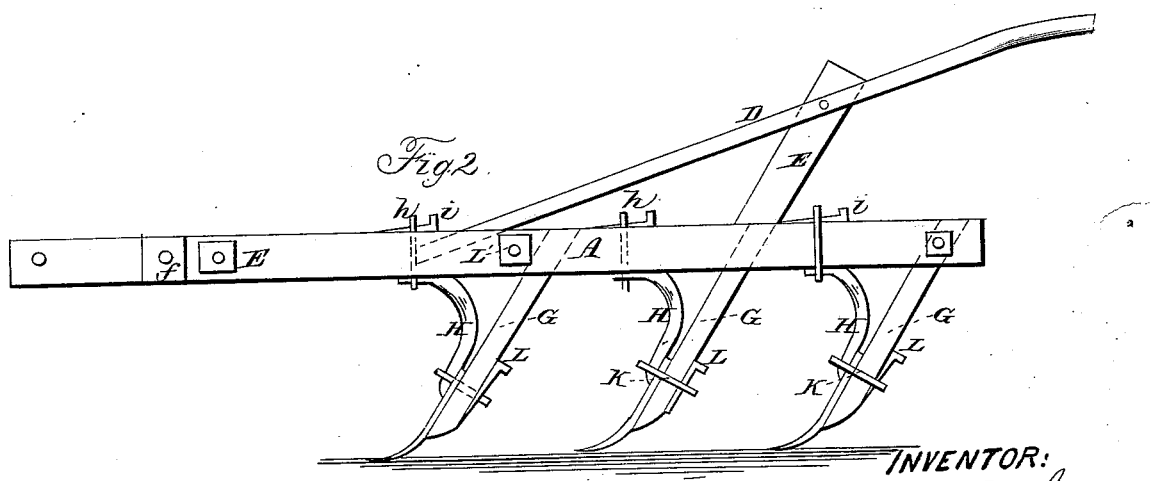
WITNESSES:
G. W. Rothwell
S. C. Kemon
INVENTOR:
James C. Bethea
per
Munn & Co
Attys
By O. Knight
Supt

United States Patent Office.

JAMES C. BETHEA, OF BLAKELY, GEORGIA.

Letters Patent No. 61,705, dated February 5, 1867.

IMPROVEMENT IN COTTON CULTIVATOR.

The Schedule referred to in these Letters Patent and making part of the same.

TO ALL WHOM IT MAY CONCERN:

Be it known that I, JAMES C. BETHEA, of Blakely, in the county of Early and State of Georgia, have invented a new and improved Gang-Plough; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is an elevation.
Figure 2 is a plan.

The beams of the respective ploughs are arranged parallel with each other, their relative distance being adjusted by collars, washers, and set-nuts. Each share or plough is clamped by a wedged shackle between the standard and brace. The upper end of the brace is shackled to the beam, the upper end of the standard pivoted to the beam. The "rake" of the standard is regulated by slipping the brace shackle upon the beam. The brace, share, and standard are all fastened together at one point by a shackle-link and wedge.

In the drawings, A A A are the beams of the plough, united by the bolts B B and the angle-pieces C at the front end. D D are the handles, which are stapled to the middle beam, and supported upon a standard, E. As a means of adjusting the distance apart of the beams A, thimbles or washers, F, are placed upon the bolts B, and a set-nut clamps the whole securely together. The standards G are pivoted at their upper ends to the beams, so as to have a capacity for adjustment. The desired position in each case is secured by means of a brace, H, which is fastened by a shackle-link, $h$, and wedge, $i$, to the beam. The share I has an upward projecting portion, which occupies a position between the standard G and the brace H, at the point embraced by the shackle K; the three parts, namely, the standard, share, and brace, being bound together by the shackle, and tightened by the wedge L. By slipping the shackle-link $h$ back or forward on the beam, the angle of the standard to the beam and to the surface of the ground is adjusted. Its position determines its tendency to skim or to run deeply into the ground, or, in other words, to regulate the depth of furrow. This arrangement or mode of attachment of the plough to the beams is applicable to ploughs of any shape, mould-board ploughs, or those having scrapers, shovel, or shares, of any description suited for specific duties.

Having described my invention, what I claim therein as new, and desire to secure by Letters Patent, is—

1. The mode, substantially as described, of fastening together the standard, brace, and share by a shackle and wedge.

2. The mode of adjusting the pivoted standard by slipping forward the shackle and the upper end of the brace upon the beam.

3. The relative lateral adjustment of the beam by means of the bolts with their collars, washers, and set-nuts, substantially as represented.

To the above specification of my improved gang-plough I have signed my hand this 22d day of December, 1866.

JAMES C. BETHEA.

Witnesses:
SOLON C. KEMON,
A. M. TANNER.